(12) United States Patent
Read

(10) Patent No.: US 7,832,014 B2
(45) Date of Patent: Nov. 9, 2010

(54) SYSTEM AND METHOD FOR PROVIDING CONTENT IN TWO FORMATS ON ONE DRM DISK

(75) Inventor: Christopher Jensen Read, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1220 days.

(21) Appl. No.: 11/359,240

(22) Filed: Feb. 21, 2006

(65) Prior Publication Data

US 2007/0195685 A1     Aug. 23, 2007

(51) Int. Cl.
    H04L 29/00    (2006.01)
(52) U.S. Cl. .................... 726/26; 369/275.3
(58) Field of Classification Search .......... 726/1, 726/2, 6, 18; 369/13.56, 13.01, 275.1, 275.3; 386/95, 125

See application file for complete search history.

(56) References Cited

U.S. PATENT DOCUMENTS

| | | | |
|---|---|---|---|
| 6,480,123 B2 * | 11/2002 | Tsutsui et al. ................. 341/50 |
| 7,165,725 B2 * | 1/2007 | Casey .................... 235/472.01 |
| 2004/0220791 A1 | 11/2004 | Lamkin et al. ................. 703/11 |
| 2004/0220926 A1 | 11/2004 | Lamkin et al. ................. 707/3 |
| 2006/0093327 A1 * | 5/2006 | Matsuhira .................... 386/95 |
| 2006/0098960 A1 * | 5/2006 | Okayama et al. ............ 386/131 |
| 2009/0276635 A1 * | 11/2009 | Baggen et al. .............. 713/182 |

OTHER PUBLICATIONS

Barry Wills, "JVC's Dual-Format DVD", website printout http://www.guidetohometheater.com/news/122704jvc/ printed Feb. 7, 2006, pp. 1-2.

* cited by examiner

Primary Examiner—Kieu Oanh Bui
Assistant Examiner—Anthony Brown
(74) Attorney, Agent, or Firm—John L. Rogitz

(57) ABSTRACT

A DRM disk such as a Blu-ray stores content in a high resolution version for playing by a disk player. The disk also stores the same content in a lower resolution version for playing by a secondary device such as a Playstation Portable (PSP). The disk can be engaged with the disk player and the lower resolution format transferred to the secondary player through a mechanism such as a removable medium (e.g., a Sony Memory Stick®) or a USB connection or other means in accordance with DRM restrictions on the disk.

9 Claims, 1 Drawing Sheet

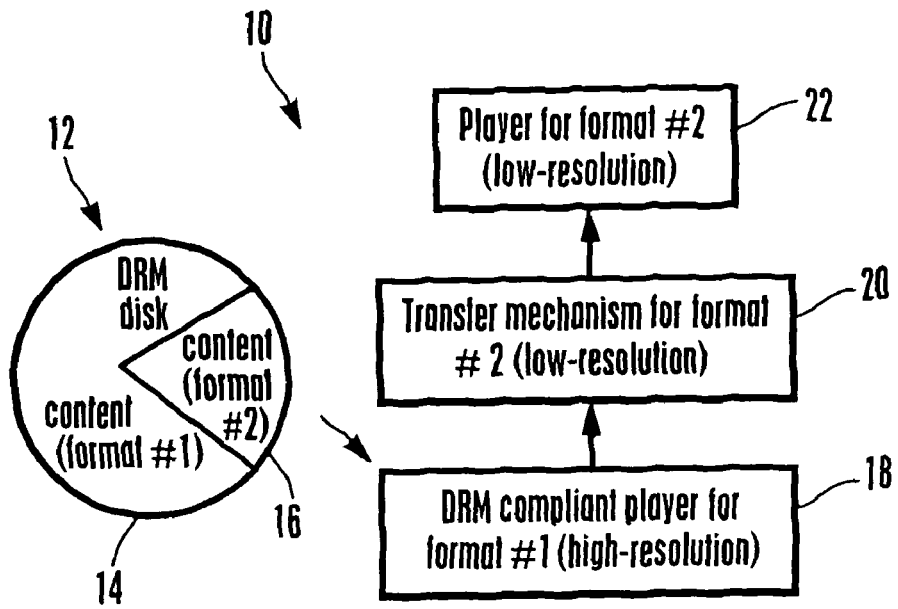
Figure 1
Figure 2
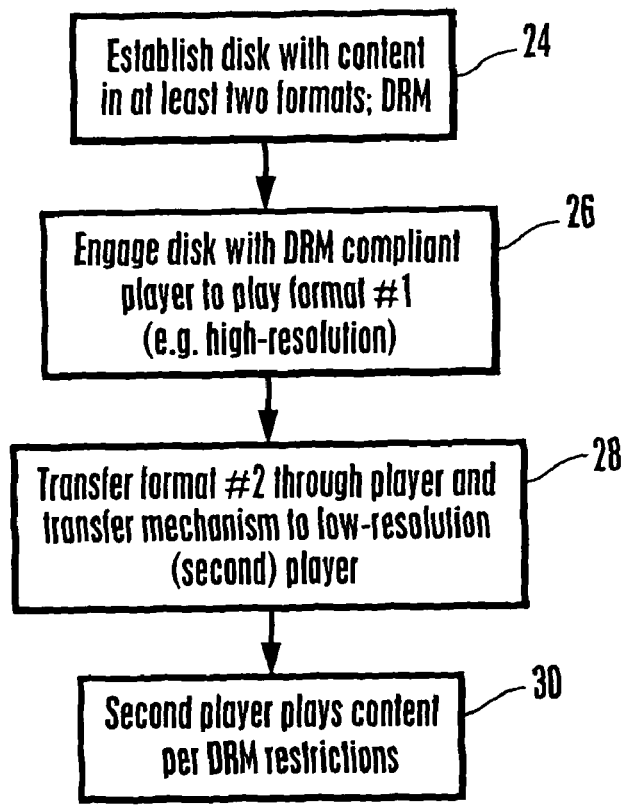

SYSTEM AND METHOD FOR PROVIDING CONTENT IN TWO FORMATS ON ONE DRM DISK

FIELD OF THE INVENTION

The present invention relates generally to providing content in at least one format on a disk, with the format being appropriate for a player that might not necessarily be capable of engaging the disk. The present invention more particularly relates to providing a disk with content in a higher resolution format suitable for playing by a disk player and in a lower resolution format suitable for playing by a secondary, lower resolution player.

DESCRIPTION OF THE RELATED ART

Digital rights management (DRM) in digital content is becoming increasingly important. DRM typically uses encryption keys that are combined with content on, e.g., a disk to encrypt the content. The disk typically also contains the rules desired to be implemented by the content provider. For example, the content provider may elect to permit a user to make a limited number of copies of the content for legitimate backup or for other legitimate use. The content provider may additionally desire that the copies expire after a limited time, and that the copies themselves cannot be further copied. Only players that have the necessary encryption keys and thus that are programmed to comply with the management rules can decrypt the content.

Sony's "Blu-Ray" technology is an example of a technology for providing content in accordance with DRM rules. Some DVD formats such as HD-DVD are alternate examples.

As recognized by the present invention, a purchaser of content may own two or more different types of audio/video players, and may wish to play the content on each. As further recognized herein, one of the players may be a disk player such as a Blu-ray player that can play high resolution versions of content on a disk, while another player may be a lower resolution player such as Sony's "Playstation Portable" (PSP) that cannot play a standard size Blu-ray disk and/or that requires a lower resolution version of the content. With these recognitions in mind, the solution herein is provided.

SUMMARY OF THE INVENTION

A data storage disk includes at least a first region storing content in a first format suitable for playing by a first player configured to engage the disk. The disk also has at least a second region storing the content in a second format different from the first format, with the second format being suitable for playing by a second player that is not configured for engaging the disk.

Preferably, the disk bears digital rights management rules (DRM). Accordingly, the disk may be, e.g., a Blu-ray disk or a HD-DVD. In some implementations the first format has a higher resolution than the second format. Without limitation, the second format can be, e.g., QVGA format, standard definition (SD) video format, or SubQCIF.

In another aspect, a disk is disclosed that bears digital rights management rules (DRM) and at least one complete audio book.

In still another aspect, a system includes a disk bearing content in at least first and second versions in at least first and second respective formats. A first player is configured to engage the disk and play the first version, and a second player that is not configured to engage the disk is configured to play content in the second format. A transfer mechanism is disposed to transfer to the second player the second version from the disk when the disk is engaged with the first player.

BRIEF DESCRIPTION OF THE DRAWINGS

The details of the present invention, both as to its structure and operation, can best be understood in reference to the accompanying drawings, in which like reference numerals refer to like parts, and in which:

FIG. 1 is a block diagram of the system of the present invention;

FIG. 2 is a flow chart of the present logic, it being understood that any appropriate component or components in the system of FIG. 1 may execute the logic.

DETAILED DESCRIPTION OF THE PREFERRED EMBODIMENTS

Initially making reference to FIG. 1, a disk implementing DRM rules is shown along with corresponding representation boxes and is generally labeled 10. The DRM disk 12 itself is partitioned into two or more regions 14 and 16. The DRM disk 12 may be a Blu-ray disk and can store at least two versions of at least one piece of audio/video content, with each version having its own respective format. The region labeled 14, the larger region, may store a high resolution format (such as, for instance, High Definition (HD) video) that can be played by a DRM-compliant player with which the disk can be engaged. The smaller region 16 can store a lower resolution format version of the same piece of content. Because the second version usually is lower resolution than the first version, it consumes relatively little storage space on the disk. The formats may not only differ in resolution but can also differ in encoding format, e.g., one format can be MPEG-2 and the other format can be H.264 or electronic book format. The book format can be for audio playing or for visual display on a monitor for reading.

A DRM compliant player 18 may be used to play the data stored in the larger, higher resolution format in region 14 on the DRM disk. Such a device may not, however be able to play data stored in the lesser resolution format in region 16.

Accordingly, to transfer the lower resolution format in region 16 from the disk to a second player 22, a transfer mechanism 20 between the two players is provided. In this way, no transcoding is required. Instead, the content is transferred to the second player as fast as it can be read from the disk. The transfer mechanism in box 20 can be a removable medium such as a Sony Memory Stick that can be inserted into the high resolution player 18 for copying the low resolution format version of the content from the disk onto the removable medium as permitted by applicable DRM rules. The removable medium is then extracted from the first player 18 and inserted into the second player 22 to make the low resolution format version of the content available for playing by the second player.

The transfer mechanism alternately may be a universal serial bus (USB) mechanism, in which case a USB cable can be connected to both players 18, 22 for copying the lower resolution version of the content from the disk in the first player 18 to a storage in the second player 22. Other transfer mechanisms may be used, e.g., IEEE 1394, wireless communication systems, Bluetooth, etc.

When the second (lower resolution) player 22 is a Playstation Portable (PSP), the second (lower resolution) version of the content in region 16 may be in QVGA format. The second player 22 alternatively may be a hard disk drive-based player such as a "Watchman", in which case the second format of the content can be standard definition (SD) video. Yet again, the second player 22 may be a wireless telephone, in which case the second format of the content in region 16 may be Sub-QCIF. Still again, the second player 22 may be an audio-only player such as a Sony Walkman. In this embodiment, an audio book, instead of requiring multiple cassette tapes to distribute, could be provided on a single disk in a single format and transferred directly to the audio player without requiring the use of an intervening personal computer. "Playstation", "Walkman", and "Watchman" are registered trademarks.

Now referring to FIG. 2, at block 24 the same piece of content is stored in at least two separate formats, in two respective different regions 14, 16 on the disk 12. At block 26 the disk 12 is engaged with the DRM compliant disk player 18 in order to play the data stored in the higher resolution format in region 14. Block 28 shows that the transfer mechanism 20 is used to transfer the data stored in the secondary format in the region 16 through the disk player 18 to the secondary player 22.

Proceeding to block 30, the secondary player 22 plays the lower resolution version of the content while complying with DRM rules that typically prohibit further copying of the content, and that might also prohibit uploading the content to the Internet. The DRM rules may also permit playing the low resolution version of the content for only a limited time, after which it expires.

The disk 12 may bear the same content in more than two formats. In addition to the above-discussed formats, other formats include but are not limited to Atrac3, Windows Media, AAC-LC, etc.

While the particular SYSTEM AND METHOD FOR PROVIDING CONTENT IN TWO FORMATS ON ONE DRM DISK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A data storage disk, comprising:
    at least a first region storing content in a first format suitable for playing by a first player configured to engage the disk; and
    at least a second region storing the content in a second format different from the first format, the second format being suitable for playing by a second player that is not configured for engaging the disk and that is configured for communicating with the first player for receiving the second format therefrom, the first player not being able to play the second format.

2. The disk of claim 1, wherein the disk bears digital rights management rules (DRM).

3. The disk of claim 1, wherein the disk is a Blu-ray disk.

4. The disk of claim 1, wherein the disk is a HD-DVD.

5. The disk of claim 1, wherein the first format has a higher resolution than the second format.

6. The disk of claim 1, wherein the second format is QVGA format.

7. The disk of claim 1, wherein the second format is standard definition (SD) video.

8. The disk of claim 1, wherein the second format is Sub-QCIF.

9. The disk of claim 1, wherein the first format has a different encoding than the second format.

* * * * *